United States Patent Office 3,702,812
Patented Nov. 14, 1972

3,702,812
PHOTOPOLYMERIZATION CATALYST COMPRISING FERROCENE AND AN ACTIVE HALOGEN-CONTAINING COMPOUND
Vincent D. McGinniss, Middleberg Heights, Ohio, assignor to SCM Corporation, Cleveland, Ohio
No Drawing. Filed Dec. 23, 1971, Ser. No. 211,731
Int. Cl. C08d 1/00; C08f 1/16
U.S. Cl. 204—159.24         15 Claims

ABSTRACT OF THE DISCLOSURE

Photosensitive catalyst systems comprising a minor amount of a ferrocene compound in combination with an activated halogenated compound selected from the group consisting of halosulfonyl compounds, $\alpha,\beta$-halosubstituted naphthalene, an allylic activated halogenated compound, and an acyl activated halogenated compound have been found to enhance the polymerization rate of vinyl monomers polymerizable with ultraviolet light.

Photopolymerization of activated vinyl monomers by irradiating a vinyl monomer with a beam of wave energy; e.g., ultraviolet light, has been practiced for some time. With the availability of synthetic sources of ultraviolet light; e.g., electric lamps as opposed to sunlight, the interest in photopolymerization of vinyl monomers has grown.

There are several advantages of effecting polymerization of vinyl monomers by the mechanism of photopolymerization. One particular advantage is that 100% monomer systems are employed, as little to no solvent is necessary. On the other hand, heat curing systems often employ volatile solvents, etc. which are vented to the atmosphere during cure. Environmentalists have objected to these coating systems as causing unnecessary air pollution. Secondly, coating of articles which are heat-sensitive can be accomplished via photopolymerization at low temperatures; but not where heating is required to effect cure. Thirdly, polymerization times are relatively short and provide for rapid coating and curing and as a result, find application for can coatings, wall board finishes, laminates, floor tile, etc.

Typically, in carrying out photopolymerization, a vinyl monomer is contacted and mixed with a minor proportion of a photosensitive catalyst. When the mixture is subjected to ultraviolet light, free radicals are produced which then aid in effecting polymerization of the vinyl monomer.

One type of catalyst or photoinitiator system that has been used heretofore for photopolymerization work are the halosulfonyl compounds; e.g., sulfonyl chlorides, such as benzene sulfonyl chloride, toluene sulfonyl chloride, etc. Another halogen-providing compound employed for effecting photopolymerization of vinyl monomers is $\alpha$-chloromethyl naphthalene.

Other types of systems for photopolymerization include the mercaptans; e.g. phenyl mercaptan; metal sulfides; e.g., zinc, and cadmium sulfide, and polynuclear quinones; e.g., anthraquinones and derivatives thereof.

Ferrocene (dicyclopentadienyl iron), has been used in the past to make light-sensitive systems for photoimaging. In that use, ferrocene is combined with a halogenated hydrocarbon; e.g., tetrabromomethane or aryl amine for reproduction. This composition, however, had not been employed as a catalyst for photoinitiation. Moreover, it is inoperable because the chlorine atoms of tetrabromomethane are not activated.

A type of catalyst which has been recently used for chemical initiation of vinyl monomers and polymerization thereof, are the metal pi olefin complexes. Examples of such complexes are: dicyclopentadienyl zinc, dicyclopentadienyl titanium dichloride, dicyclopentadienyl vanadium, etc.

Most surprisingly, it has been found that a minor amount of a ferrocene compound, when combined with an activated halogenated compound selected from the group consisting of a halosulfonyl compound, a halosubstituted naphthalene, an allylic activated halogenated compound, and an $\alpha$-acyl-activated halogenated compound, synergistically affects the activated halogenated compound in the presence of wave energy; e.g., ultraviolet light, thereby enhancing its effectiveness as a polymerization catalyst for the curing of vinyl monomers under ultraviolet light.

A minor amount of a ferrocene compound, as later described, when contacted with an activated halogenated compound, induces a reaction therewith causing a physical change in the resulting mixture. A reaction is evidenced as the mixture when subjected to analysis by ultraviolet absorption spectroscopy exhibits, in the spectrograph obtained from such analysis, peaks not seen in either of the components taken individually. Generally, a color change also accompanies the reaction and the resulting color of the mixture is greenish. Although not intending to be bound by theory, it is believed that this reaction presents the compounds in a form amenable to breakdown when subjected to a beam of wave energy; e.g., ultraviolet light. It appears such form enhances its effectiveness as a photopolymerization catalyst. Certainly the effect of a ferrocene compound in the presence of the activated halogenated compound is synergistic in that ferrocene by itself or a derivative thereof, does not exhibit substantial photocatalytic properties, especially with regard to its ability to effect photopolymerization of vinyl monomers. Although the activated halogenated compounds have been widely used as photopolymerization catalysts for the polymerization of vinyl monomers, the rate of polymerization of such vinyl monomers is much slower than with a photosensitive catalyst of activated halogen-containing compound in contact with a minor proportion of ferrocene.

Advantages of this catalyst system include the ability to polymerize vinyl monomer samples at fast rates even where held in soft glass vials; the ability to polymerize films of vinyl monomer at a rate of at least 300 linear feet per minute with a radiation source 6 inches away even in the presence of air; and the ability to produce films having little or no discoloration.

By a "ferrocene compound," it is meant to refer to compounds containing a dicyclopentadienyl iron grouping, dicyclopentadienyl iron often being referred to as ferrocene. The compound having dicyclopentadienyl iron can be a polymer-containing polymerized dicyclopentadienyl iron therein, monomer-containing dicyclopentadienyl iron, or a substituted-dicyclopentadienyl iron compound. Examples of ferrocene compounds suitable for practicing the invention include: ferrocene, vinyl ferrocene, acetyl ferrocene, tertiary-amyl ferrocene, benzoyl-ferrocene, n-butyl ferrocene, chlorocarbonyl ferrocene, 1,1'-diacetyl ferrocene, 1,1'-dibutyl ferrocene, 1,1'-dichlorocarbonyl ferrocene, 1,1'-dihydroxymethyl ferrocene, 1,1'-dimethyl ferrocene, N,N'-dimethylaminomethyl ferrocene, dimethyl ferrocenedioate, ferrocene acetonitrile, ferrocene aldehyde, ferrocene carboxylic acid, 1,1'-ferrocene dicarboxylic acid ferrocenyl alanine, ferrocenyl glycine, (ferrocenylmethyl) trimethyl ammonium bromide, $\alpha$-hydroxyethyl ferrocene, hydroxymethyl ferrocene, methyl ferroceneoate, bis-4-methylaminobenzoyl ferrocene, dipropanol ferrocene, and others.

As stated, one method of incorporating the ferrocene compound with an activated halogen compound is to incorporate it into a polymer system. One of the methods for forming such polymers is to use a substituted ferrocenyl derivative having a hydroxy group or carboxyl group and utilizing such groups to form the polymer. Unsaturated polyesters can be produced by reacting for example, either a hydroxy ferrocenyl compound or a carboxylic ferrocenyl compound with appropriate reactants to form unsaturated polyesters. For example, ferrocene dicarboxylic acid can be included along with an α,β-unsaturated carboxylic acid in the reaction with polyols to produce a polyester. Likewise, 1,1'-dihydroxymethyl ferrocene can be used as part of the polyol in forming an unsaturated polyester resin. Another method is to polymerize a ferrocenyl compound having vinyl unsaturation. Addition polymers; e.g., copolymers, homopolymers, and interpolymers, can be prepared by reacting vinyl ferrocene with other vinyl monomers.

For reasons of efficiency and economy, dicyclopentadienyl iron is the preferred ferrocene compound for practicing the invention as it is of relatively low cost as compared to other ferrocenyl compounds and provides for easy formulation of the photosensitive polymerization catalyst.

The activated halogenated compounds useful for making the photosensitive catalyst system for the polymerization of vinyl monomers predominately are those which have an activating group alpha-positioned to the halogen compound, the halosulfonyl compounds, and the acid halides. By activated "halogenated compounds" it is meant to refer to compounds having an activated chlorine atom. Acid halides; e.g., compounds having a group pendant therefrom of the general formula:

are activated and highly effective in practicing the invention. Allylic groups can also activate the halide and such compositions can be represented by the formula:

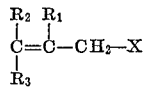

A wide variety of substituent groups can be incorporated on the allylic carbon atoms as designated by $R_1$, $R_2$, $R_3$ and include aliphatic groups; e.g., alkyl group, aromatic, polynuclear groups, and so forth. Ester, amide, ketone, nitrile, and ether groups can also be substituent from such carbon atoms.

Activation can also come from acyl groups and compounds having groups pendant therefrom of the formula:

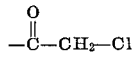

can be used. Ketones, esters, and amides are exemplary of such groups.

Ether groups alpha-positioned to the halogen can also activate a halogen compound. Such groups are represented by the formula —O—C—CH$_2$—Cl and when pendant from an organic radical provide sufficient reactivity for practicing the invention.

In discussing the halogenated compounds as X in the above formulas, it is meant to refer only to the halogen atoms of chlorine, bromine, and iodine. When referring to the chlorides as specific examples, it is also to be understood that the corresponding bromides and iodides could be used. For reasons of efficiency and economy though, in practicing the invention, the preferred halogen compound is chlorine. Fluorine is not to be considered as a halogen within the perview of this case, because of cost of producing many of the compositions and sometimes unavailability of the compositions.

One class of activated halogenated hydrocarbons are the halosulfonyl compounds. Many halosulfonyl compounds including sulfonyl chloride itself, can be used.

Aliphatic halosulfonyl compounds can be described by the formula R—SO$_2$—X wherein R is a lower aliphatic radical having from 1 to 4 carbon atoms. Examples of aliphatic sulfonyl halides include the alkyl sulfonyl chlorides such as ethane sulfonyl chloride methane sulfonyl chloride, trichloromethane sulfonyl chloride, and substituted derivatives thereof.

Aromatic sulfonyl chlorides have been widely used as photopolymerization catalysts and include 1,3-benzene disulfonyl chloride, benzene sulfonyl chloride, chlorobenzene sulfonyl chloride, acetamidobenzene sulfonyl chloride, nitrobenzene sulfonyl chloride, and toluene sulfonyl chloride.

Polynuclear sulfonyl chloride compounds, anthracene sulfonyl chloride, phenanthranene sulfonyl chloride, phenanthracene sulfonyl chloride, and so forth. Examples of substituted polynuclear sulfonyl chlorides are the polynuclear quinone sulfonyl chlorides and include: anthraquinone sulfonyl chloride, chloroanthraquinone sulfonyl chloride, dimethyl anthraquinone sulfonyl chloride, naphthraquinone sulfonyl chloride, phenanthraquinone sulfonyl chloride, benzanthraquinone sulfonyl chloride, phenanthranene quinone sulfonyl chloride, methylnaphthylquinone sulfonyl chloride, nitroanthraquinone sulfonyl chloride, acetamido phenanthraquinone sulfonyl chloride; the ketone-activated polynuclear quinones, such as a methyl ketone anthraquinone sulfonyl chloride. Acylated polynuclear quinone sulfonyl chlorides wherein the acylated groups are esters and ethers substituent from the polynuclear group, and so forth can also be used.

Heterocyclic sulfonyl chlorides include the 5- and 6-membered heterocyclic compounds containing a nitrogen, oxygen, or sulfur atom. Additionally, they can be polynuclear heterocyclic compositions where the rings are fused. Examples of such heterocyclic sulfonyl halides are pyridine sulfonyl chloride, piperidine sulfonyl chloride, furan sulfonyl chloride, benzofuran sulfonyl chloride; the thiophene sulfonyl chlorides, such as benzothiophene sulfonyl chloride, xanthan sulfonyl chloride, and so forth. Additionally, the aromatic and polynuclear radicals of the heterocyclic 5- and 6-membered rings containing the nitrogen, oxygen, and sulfur atom can also be substituted with alkyl groups; e.g., esters, ketones, amide groups, acetamide groups, and so forth.

Examples of other halosulfonyl compositions typically used as photopolymerization catalysts are found in U.S. Pats. 3,113,024 and 2,579,095 and such halosulfonyl compounds are incorporated by reference.

It should be noted from the examples of the above sulfonyl chlorides that the sulfonyl chloride grouping be activated. Activation in most instances, occurs by having alpha-positioned from the sulfonyl chloride grouping an activating group such as an aromatic radical, acyl group, and so forth. Aliphatic sulfonyl chlorides, with the exception of a methane or ethane, generally are not adapted for making desirable polypolymerization catalysts with the sulfonyl chlorides, as the aliphatic portion tends to deactivate the grouping. For example, compositions such as methylene chloride, chloroform, carbon tetrachloride, dichloromethane, trichloroethylene, do not have activated halogenated atoms, and are unacceptable in practicing the invention. Polymerization of vinyl monomers sensitized with such compositions is very slow.

Halosubstituted naphthalene compositions which are activated and can be used in practicing the invention are those commonly used as a photosensitizer in the polymerization of vinyl monomers with ultraviolet light. Such compositions are known, and examples of same are shown in U.S. Pat. 2,505,068. These compositions are to be incorporated by reference Examples of halo-substituted naphthalene include β-chloromethyl naphthalene, α-chloromethyl naphthalene, 1,4-dichloromethyl naphthalene, 1,5 - dichloromethyl naphthalene, the beta - substituted analogs thereof, e.g., 2,3-dichloromethyl naphthalene, 2,6-dichloromethyl naphthalene, and so forth. It is to be understood that the iodo and bromo analogs of the halo-substituted naphthalenes can also be utilized in place of the chloronaphthalene. For reasons of efficiency and economy, the chlorosubstituted naphthalenes are preferred for practicing this invention.

As mentioned in the broad description of the invention, alpha-activated acyl halogenated compounds and acid halides can be used for practicing the invention. These compounds can be described by the generic formula:

wherein R is an aromatic, aliphatic, alkylene radical, or substituted radical thereof; and X is a halogen atom or halogenated methyl radical. By "substituted radical," it is meant to refer to radicals having groups pendant therefrom; e.g., alkyl, ester, ether, amide, nitro, amine, and aldehyde groups. Generally, the substituent group pendant from the aromatic, aliphatic, and alkylene radical does not have more than 4 carbon atoms. In referring to the formula, the aliphatic radical substituent from the carbonyl group should be lower alkyl having from 1 to 6 carbon atoms. Such alkyl groups include methyl, ethyl, propyl, butyl, and so forth. Aromatic groups substituent from the carbonyl group are most often employed and such aromatic groups would include polynuclear groups. Alkyl radicals are those having aliphatic radicals having unsaturation therein, and usually not containing more than 6 carbon atoms. Preferably, acrylato functional groups are used; e.g., those having the linking $$CH_2=CH-$$

pendant from the carbonyl group. Examples of compounds falling within the generic formula above include: phenacyl chloride, ethyl and chloromethyl ketone, chloroacetone, ethylchloroacetate, acetyl chloride, allyl chloroformate, chloroacetyl chloride, and so forth. Examples of compositions falling within the generic formula are also given in U.S. Pat. 2,548,685 and are incorporated by reference.

As mentioned before, allylic activated halogenated compounds can be used in practicing the invention. The generic formula of the allylic activated halogenated compounds can be described as follows:

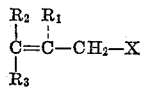

wherein $R_1$ is hydrogen, a lower alkyl group, or phenyl group; $R_2$ and $R_3$ are like or unlike, and can be hydrogen, alkyl, aromatic, or polynuclear groups provided that they are not polynuclear at the same time. The key feature to such composition is the allylic activation of the halogen atom in the composition. It appears that the substituent groups pendant from the allylic carbon atoms have little effect on the effectiveness of the catalyst system for UV polymerization. Generally, and for reasons of efficiency and economy, the R groups; e.g., $R_1$, $R_2$, and $R_3$ are hydrogen, lower alkyl; that is, having from 1 to 4 carbon atoms or aromatic with only one of the R groups being an aromatic for a given composition. Examples of such allylic activated compounds include 1,1-diphenyl-3-chloro-1-propene, 3-chloro-2-propene, 1,1-diethyl-3-chloro-2-propene, 1-acetyl-3-chloro-2-propene and 1-amido-3-chloro-2-propene.

The vinyl monomers useful in practicing the invention are those which have been used heretofore in photopolymerization. Typically, these vinyl monomers are readily polymerizable with a redox catalyst system. These vinyl monomers generally are activated by another group such as an unsaturated group, a carbonyl group, a halogen atom, and so forth. One class of vinyl monomers particularly adapted for photopolymerization are the lower alkyl esters of acrylic and methacrylic acid, the alkyl portion having from 1 to 6 carbon atoms. Examples of such alkyl esters include: methylmethacrylate, ethylmethacrylate, 2-ethylhexyl methacrylate, butylacrylate, isobutyl methacrylate, the corresponding hydroxy acrylates; e.g., hydroxy ethylacrylate, hydroxy propyl acrylate, hydroxy ethylhexyl acrylate, also the glycol acrylates; e.g., ethylene glycol dimethacrylate, hexamethylene glycol dimethacrylate, the allyl acrylates; e.g., allyl methacrylate, diallyl methacrylate, methallyl methacrylate; the epoxy acrylates; e.g., glycidyl methacrylate; and the aminoplast acrylates; e.g., melamine acrylate.

Other classes of vinyl monomers are vinyl acetate, vinyl and vinylidine halides; e.g., vinyl chloride, vinylidine chloride, amides; e.g., methacrylamide, acrylamide, diacetone acrylamide, butadiene, styrene, vinyl toluene, and so forth.

Another class of unsaturated compounds which can be photopolymerized by using the catalyst of this invention and is, therefore, included in the term "vinyl monomers" are unsaturated polyesters capable of being crosslinked with styrene. Crosslinkable unsaturated polyesters are widely known and reported in the art. Typically, they are derived by the reaction of a polyhydric alcohol and an α,β-unsaturated dicarboxylic acid or anhydride thereof. Examples of polyhydric alcohols suitable for making this class of polyesters include: glycerin, propylene glycol, hexanediol, glycerol, pentaerythritol, trimethylolpropane, glycol ethers, and so forth. Examples of α,β-unsaturated dicarboxylic acids or their anhydride counterparts which are also useful in making the polyester include: maleic, fumaric, itaconic, and citraconic.

In the polymerization process of vinyl monomers, a beam of wave energy is used to induce breakdown of the photosensitive catalyst thereby creating free radicals. Preferably, the wave energy is supplied by ultraviolet light; that is, light having a wave length of from about 1500–4000 angstroms. Sunlight is a good source of such light.

The photosensitive photopolymerization catalyst of this invention is included in the vinyl monomer in a proportion of about 1 to 10% by weight of the vinyl monomer. The level of photosensitive catalyst used typically corresponds to the level commonly used with the activated halogenated composition in the polymerization of vinyl monomers. When the level of photosensitive catalysts falls below about 1% by weight of the vinyl monomer, the polymerization rate tends to fall off substantially. Levels of catalyst above about 10% often do not significantly enhance the rate of polymerization of the vinyl monomer to justify such high levels and sometimes affect the coloration of the cured polymer. For reasons of efficiency and economy, the preferred level of catalyst used in the polymerization of vinyl monomers is from about 1½% to 3% by weight of the vinyl monomer.

The photosensitive photopolymerization catalyst of this invention comprises from about 0.01 to 50% by weight of ferrocene compound to activated halogenated compound. As stated, only a minor proportion of ferrocene compound need be present and in contact with the activated halogenated compound to affect a reaction therewith and synergize the catalyst for enhancing the rate of polymerization of the vinyl monomer. Levels of ferrocene compound above 50% by weight of the halogenated compound often afford no practical advantages and sometimes often cause discoloration of the cured polymer due to the presence of iron. For reasons of efficiency and economy, the level of ferrocene compound to activated halogenated compound is from about 1 to 5% by weight; that is, it would comprise from about 1 to 5 parts ferrocene compound to about 95 to 99 parts activated halogenated compound. Levels from 1 to 5% by weight ferrocene compound ostensibly provide faster polymerization rates than the 0.01% level and yet do not significantly affect the coloration of the resulting polymer formed. For these reasons such range is preferred.

Other photosensitive polymerization catalysts can also be included with the photosensitive catalyst of this invention. However, no significant advantages have been noted by the incorporation of other catalytic systems. The catalyst system used in initiating free radical formation should contain at least 50% of the invented catalyst system disclosed herein. Preferably, all of the catalyst used for sensitizing the monomer is the invented catalyst system. Examples of other photosensitive catalysts which can be included as a portion of the photosensitive catalyst include the polynuclear quinones, mercaptans, such as aryl mercaptans, triphenyl phosphine, benzophenone, cobalt, nickel, iron salts, and so forth.

A particular advantage of this catalyst system; i.e., the ferrocene compound in activated halogenated compound is that it can be used with both pigmented and unpigmented monomer systems. It is noted that very good "clears" are produced without visible discoloration. Such inorganic and organic pigments suitable as colorants for polymers are well known to those skilled in the art and examples of same are described in other references.

The following examples are provided to illustrate preferred embodiments of the invention, and are not intended to restrict the scope thereof. All parts are parts by weight, and all percentages are weight percentages. All temperatures are in degrees Fahrenheit.

EXAMPLE I

A photosensitive catalyst system is prepared by dissolving 0.2 part ferrocene in 10 parts of benzene sulfonyl chloride. Ferrocene is soluble in benzene sulfonyl chloride and dissolves readily therein on mixing. The benzene sulfonyl chloride changes color on addition of ferrocene to a greenish color. Ninety-eight parts of acrylic acid and 2 parts of photosensitive catalyst are mixed together forming a first sample. The resultant sample is placed in a soft glass vial which is maintained at constant temperature by placing in a water-cooled quartz chamber. A temperature of about 70° F. is maintained inside the chamber. The chamber and sample are placed about 5 inches from an ultraviolet lamp manufactured by the General Electric Co. having Model No. H14T3. The lamp has an input wattage of 850 watts and an output wattage of about 255 watts; 28 watts in the far UV spectrum, 68 watts in the middle UV section, 52 watts in the near UV section, and 107 watts in the visible section. The sample polymerizes in about 5 minutes forming a hard solid body.

When 98 parts acrylic acid and 2 parts ferrocene are mixed together and subsequently irradiated in like manner as the first sample, no significant reaction occurs, even after a period of 30 minutes. The sample remains in liquid form and does not convert to a solid body, thus showing that ferrocene alone does not possess desirable photosensitive catalyst properties for such monomers.

When 98 parts of acrylic acid and 2 parts of benzene sulfonyl chloride are mixed to form a photosensitized monomer system and subsequently irradiated with ultraviolet light in like manner as in the first sample, it is noted that no reaction takes place, even after a period of about 30 minutes. The sample remains in liquid form.

EXAMPLE II

A similar photosensitive catalyst system to that of Example I is prepared by mixing 1 part ferrocene carboxylic acid with 10 parts benzene disulfonyl chloride. Then, 98 parts of methylmethacrylate are combined with 2 parts of the photosensitive catalyst system and the resultant mixture placed in a soft glass vial. The sample is placed about 5 inches from the lamp and irradiated with ultraviolet light. After a period of approximately 30 minutes, the methylmethacrylate polymerizes to a hard, solid body.

When 98 parts methyl methacrylate and 2 parts benzene sulfonyl chloride are mixed together to form a photosensitized mixture without ferrocene carboxylic acid and irradiated in like manner as the above sample, no apparent polymerization is noted after a period of 30 minutes. The sample remains ostensibly in liquid form.

EXAMPLE III

Fifty parts hydroxy ethylacrylate and 50 parts melamine acrylate are mixed with 2 parts of a photosensitive catalyst of Example I. The resultant photosensitized monomer is spread on a glass slide and drawn with a draw bar producing a liquid film of approximately 3 mils thickness. The resultant slide then is irradiated with ultraviolet light from the lamp described in Example I. A hard film is produced after about 10 minutes of irradiation.

EXAMPLE IV

A photosensitive catalyst system is prepared by mixing 10 parts α-chloromethyl naphthalene and 0.2 part ferrocene. A color change is noted during mixing, the resultant color being slightly greenish. When 2 parts of this photosensitive catalyst system are mixed with 98 parts acrylic acid and the resultant sample irradiated in like manner as the sample of Example I, it is estimated that about a 95% conversion of monomer to polymer is noted after 7 minutes. Some liquid monomer in slight amount is present.

EXAMPLE V

A photosensitive catalyst system is prepared by mixing 0.5 part vinyl ferrocene and 10 parts phenacyl chloride until the vinyl ferrocene is dissolved therein. A color change is noted on mixing. Four parts of this photosensitive catalyst system then is mixed with 96 parts of 2-ethylhexyl acrylate, and the resultant sample placed in a soft glass vial. On irradiation, in like manner as in Example I, the monomer cures to a hard, solid body in approximately 30 minutes. The same monomer system sensitized with only the phenacyl chloride does not polymerize on irradiation in like manner as the above sample. Substantial liquid monomer is present after 30 minutes.

EXAMPLE VI

A photosensitive catalyst system is prepared by mixing 0.4 part ferrocene and 10 parts paratoluene sulfonyl chloride. Three parts of this photosensitive catalyst system then are mixed with vinyl acetate, and the sensitized monomer placed in a soft glass vial. When the sample is irradiated with the lamp described in Example I, polymerization occurs rapidly and the monomer is substantially completely polymerized in about 15 minutes.

EXAMPLE VII

A ferrocene-sensitized crosslinkable polyester is prepared by reacting ferrocene dicarboxylic acid, maleic anhydride, and pentaerythritol. The polyester resin contains 20% by weight ferrocene dicarboxylic acid, 50% maleic acid units, and 30% pentaerythritol. 0.5 part of the polyester are mixed with 10 parts benzene sulfonyl chloride and the mixture added and blended with 50 parts liquid hydroxy ethyl acrylate and 50 parts melamine acrylate. The resultant photosensitized monomer system is applied to a glass slide and drawn down forming a film of about 3 mils thickness. A hard film is obtained when the slide is irradiated in a manner similar to Example III after about 10 minutes.

EXAMPLE VIII

A photosensitizer for catalyzing methyl methacrylate is prepared by mixing 0.01 part ferrocene with 10 parts trichloromethane sulfonyl chloride. On mixing, the color of the catalyst changes, the resultant color being a greenish color. Two parts of this catalyst then is mixed with 98 parts methyl methacrylate monomer, thereby sensitizing the vinyl monomer system. The monomer then is placed in a soft glass vial, capped, and irradiated in like manner as in Example I. About a 75% conversion of the monomer to polymer occurs in 30 minutes. The rate of polymerization is somewhat slower than Example I presumably because of the lower concentration of ferrocene in contact with the sulfonyl chloride.

EXAMPLE IX

Ten parts anthraquinone sulfonyl chloride is mixed with 4 parts of ferrocene until the ferrocene is dissolved in the anthraquinone sulfonyl chloride, thereby forming a photosensitizer. Four parts of this catalyst then is mixed with 96 parts of hydroxy propyl methyl methacrylate, then charged to a soft glass vial and capped. On irradiation in like manner as in Example I, substantially complete polymerization of the monomer occurs in 30 minutes.

EXAMPLE X

A photosensitizer is prepared by mixing 0.2 part ferrocene and 10 parts allyl chloroformate together until the ferrocene is dissolved in the allyl chloroformate. One part of the resultant photosensitizer formed is mixed with 99 parts of styrene. The resultant solution is spread over a glass slide and drawn down to a thickness of about 2 mils. On subjecting the glass slide and monomer thereon to UV irradiation at a distance of 5 inches from the source, polymerization occurs and is complete in about 20 minutes.

What is claimed is:

1. In a process for photopolymerizing a vinyl monomer in the presence of a photoinitiator by irradiating said monomer with a beam of ultraviolet light, the improvement for enhancing the rate of polymerization of said monomer which comprises using as a major proportion of said photoinitiator from about 1–10% by weight of said vinyl monomer, a synergistic photosensitizer comprising a ferrocene containing compound and an activated halogenated composition selected from the group consisting of a halosulfonyl compound, an α,β-halosubstituted naphthalene, an allylic activated halogenated compound represented by the formula:

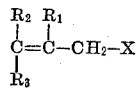

wherein $R_1$ is hydrogen, a lower alkyl group, or phenyl group; $R_2$ and $R_3$ are like or unlike, and can be a hydrogen, alkyl, aromatic or polynuclear group provided that they are not polynuclear at the same time, and X is a halogen atom and an acyl activated halogenated compound having pendant therefrom a group represented by the formula:

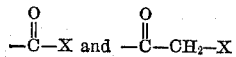

wherein X in the formulas is a halogen atom; and said ferrocene containing compound being present in a proportion of from about 0.01–50% by weight of said activated halogenated compound.

2. The process of claim 1 wherein said ferrocene-containing compound is present in a proportion of from about 1 to 5% by weight of said activated halogenated compound.

3. The process of claim 2 wherein said ferrocene-containing compound is a polymer.

4. The process of claim 2 wherein said ferrocene-containing compound is ferrocene.

5. The process of claim 4 wherein said activated halogenated compound is a halosulfonyl compound.

6. The process of claim 5 wherein said halosulfonyl compound is an organosulfonyl chloride.

7. The process of claim 6 wherein said organosulfonyl chloride is an aryl sulfonyl chloride.

8. The process of claim 7 wherein said aryl sulfonyl chloride is benzene sulfonyl chloride.

9. The process of claim 6 wherein said organosulfonyl chloride is heterocyclic sulfonyl chloride.

10. The process of claim 6 wherein said organosulfonyl chloride is a polynuclear sulfonyl chloride.

11. The process of claim 10 wherein said polynuclear sulfonyl chloride is a polynuclear quinone sulfonyl chloride.

12. The process of claim 4 wherein said activated halogenated composition is an allylic activated halogenated composition.

13. The process of claim 4 wherein said activated halogenated composition is a halosubstituted naphthalene.

14. The process of claim 13 wherein said halosubstituted naphthalene is α-chloromethyl naphthalene.

15. The process of claim 4 wherein said activated halogenated composition is an α-acyl activated halide.

References Cited

UNITED STATES PATENTS 3,616,366   10/1971   Passalenti et al. ___ 204—159.15

OTHER REFERENCES

Photosensitized Initiation of Vinyl Polymerization by a System of Ferrocene and Carbon Tetrachloride, J. of Polymer Science, Polymer Letters, vol. 10, pp. 341–344 (1972).

MURRAY TILLMAN, Primary Examiner

R. B. TURER, Assistant Examiner

U.S. Cl. X.R.

96—115 P; 204—159.23; 252—431; 260—868